US012789976B2

(12) United States Patent
Andreani et al.

(10) Patent No.: US 12,789,976 B2
(45) Date of Patent: Nov. 10, 2026

(54) FAIRING ARRANGEMENT FOR A HIGH-LIFT MECHANISM OF AN AIRCRAFT

(71) Applicant: Airbus Operations GmbH, Hamburg (DE)

(72) Inventors: Luc Andreani, Buchholz (DE); Florian Lorenz, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 219 days.

(21) Appl. No.: 18/631,807

(22) Filed: Apr. 10, 2024

(65) Prior Publication Data

US 2024/0343380 A1 Oct. 17, 2024

(30) Foreign Application Priority Data

Apr. 11, 2023 (EP) .................................... 23167378

(51) Int. Cl.
*B64C 7/00* (2006.01)
*B64C 9/02* (2006.01)
*B64C 9/18* (2006.01)

(52) U.S. Cl.
CPC .................. *B64C 7/00* (2013.01); *B64C 9/02* (2013.01); *B64C 9/18* (2013.01)

(58) Field of Classification Search
CPC .... B64C 7/00; B64C 9/02; B64C 9/18; B64C 9/16; B64C 3/36
See application file for complete search history.

(56) References Cited

U.S. PATENT DOCUMENTS 4,854,528 A * 8/1989 Hofrichter ................ B64C 9/18 244/130
7,766,282 B2 * 8/2010 Kordel ...................... B64C 9/16 244/215
(Continued)

FOREIGN PATENT DOCUMENTS

CA 2782041 A1 * 3/2013 ............... B64C 9/16
CA 3033754 A1 * 9/2019 ............... B64C 9/20
(Continued)

OTHER PUBLICATIONS

Extended European Search Report for EP Application No. 23167378.1 mailed Sep. 15, 2023, 7 pages.
(Continued)

*Primary Examiner* — Assres H Woldemaryam
(74) *Attorney, Agent, or Firm* — Nixon & Vanderhye, PC

(57) ABSTRACT

A fairing arrangement for a high-lift mechanism for an aircraft is disclosed including a flap to be arranged at a trailing edge of an aircraft wing, and a mounting and guiding mechanism for the flap. The fairing arrangement includes a flap side fairing unit and a wing side fairing unit. The flap side fairing unit includes a flap side fairing for covering an aft part of the mounting and guiding mechanism and a flap side fairing mount for mounting the flap side fairing to the flap. The wing side fairing unit includes a wing side fairing for covering a forward part of the mounting and guiding mechanism, and a wing side fairing mount for mounting the wing side fairing to the wing. The wing side fairing mount is configured for movably connecting the wing side fairing to the wing such that the wing side fairing is rotatable around an axis directed at least partially in a vertical direction.

19 Claims, 19 Drawing Sheets

(56) References Cited

U.S. PATENT DOCUMENTS

| | | | | |
|---|---|---|---|---|
| 7,798,450 | B2 * | 9/2010 | Patzelt | B64C 9/18 244/211 |
| 8,303,248 | B2 * | 11/2012 | Cabrera | B64C 27/605 416/102 |
| 8,382,045 | B2 * | 2/2013 | Manley | B64C 3/48 244/218 |
| 8,844,878 | B2 * | 9/2014 | Voss | B64C 9/28 244/215 |
| 9,399,508 | B2 * | 7/2016 | Lakic | B64C 3/38 |
| 9,452,823 | B2 * | 9/2016 | Havar | B64C 9/16 |
| 2015/0060607 | A1 * | 3/2015 | Havar | B64C 3/54 244/99.2 |
| 2015/0292561 | A1 * | 10/2015 | McNeil | F16C 11/0614 384/463 |
| 2016/0068255 | A1 | 3/2016 | Soenarjo | |
| 2020/0407041 | A1 * | 12/2020 | Tsai | B64C 7/00 |
| 2021/0316840 | A1 | 10/2021 | Machunze et al. | |
| 2022/0306274 | A1 | 9/2022 | Tulloch | |

FOREIGN PATENT DOCUMENTS

| | | | | |
|---|---|---|---|---|
| EP | 2578489 | A2 * | 4/2013 | B64C 9/16 |
| EP | 2516257 | B1 | 3/2016 | |

OTHER PUBLICATIONS

"Nature inspired wing demonstrator completes wind tunnel tests", Airbus press release of Apr. 12, 2022, <https://www.airbus.com/en/newsroom/press-releases/2022-04-nature-inspired-wing-demonstrator-completes-wind-tunnel-tests>, 2 pages.

"Airbus launches extra high performance wing demonstrator to fortify decarbonisation ambition", Airbus press release of Sep. 22, 2021, <https://www.airbus.com/en/newsroom/press-releases/2021-09-airbus-launches-extra-high-performance-wing-demonstrator-to-fortify>, 2 pages.

* cited by examiner

FAIRING ARRANGEMENT FOR A HIGH-LIFT MECHANISM OF AN AIRCRAFT

CROSS REFERENCE TO RELATED APPLICATION

This application claims priority to European Patent Application Number EP 23167378.1, filed Apr. 11, 2023, the entire contents of which is hereby incorporated by reference.

BACKGROUND

The present disclosure is directed toward a fairing arrangement for a high-lift mechanism of an aircraft, wherein the high-lift mechanism includes a flap to be arranged at a trailing edge of an aircraft wing and a mounting and guiding mechanism for the flap. More specifically, the disclosure is directed toward a high-lift system, an aircraft wing and an aircraft comprising such fairing arrangement.

With regard to prior art, reference is made to the following citations:

(1) US 2022 306 274 A1
(2) US 2021 316 840 A1
(3) US 2016 068 255 A1
(4) EP 2 516 257 B1
(5) Airbus press release of Sep. 22, 2021, https://www.airbus.com/en/newsroom/press-releases/2021-09-airbus-launches-extra-high-performance-wing-demonstrator-to-fortify
(6) Airbus press release of Apr. 12, 2022, https://www.airbus.com/en/newsroom/press-releases/2022-04-nature-inspired-wing-demonstrator-completes-wind-tunnel-tests References (1) to (4) disclose a fairing arrangement for a high-lift mechanism of an aircraft, wherein the high-lift mechanism includes a flap to be arranged at a trailing edge of an aircraft wing and a mounting and guiding mechanism for the flap, the fairing arrangement comprising a flap side fairing unit and a wing side fairing unit, the flap side fairing unit comprising a flap side fairing for covering an aft part of the mounting and guiding mechanism and a flap side fairing mount for movably mounting the flap side fairing to the flap, the wing side fairing unit comprising a wing side fairing for covering a forward part of the mounting and guiding mechanism and a wing side fairing mount for mounting the wing side fairing in a rigidly fixed manner to the wing.

SUMMARY

The present disclosure contemplates fairing arrangements with improved functionality.

The present disclosure provides a fairing arrangement for a high-lift mechanism of an aircraft, wherein the high-lift mechanism includes a flap to be arranged at a trailing edge of an aircraft wing and a mounting and guiding mechanism for the flap. The fairing arrangement comprises a flap side fairing unit and a wing side fairing unit. The flap side fairing unit comprises a flap side fairing for covering an aft part of the mounting and guiding mechanism and a flap side fairing mount for rigidly mounting the flap side fairing to the flap. The wing side fairing unit comprises a wing side fairing for covering a forward part of the mounting and guiding mechanism and a wing side fairing mount for mounting the wing side fairing to the wing. The wing side fairing mount is configured for connecting the wing side fairing movably to the wing. For example, the wing side fairing mount is configured such that the wing side fairing mounted therewith or at least a part thereof is movable in a lateral direction. The wing side fairing mount may be configured for connecting the wing side fairing movably to the wing such that the wing side fairing is rotatable around an axis directed at least partially in a vertical direction. The wing side fairing and the flap side fairing are connected by a fairing joint allowing relative movements of the fairings during movement of the flap such that the movement of the wing side fairing relative to the wing is controlled by the movement of the flap side fairing. The fairing joint may be configured such that the rotational movement of the wing side fairing around the axis is controlled or driven by the movement of the flap side fairing. Thus, in use, the flap side fairing can be rigidly mounted to the flap for movement therewith. The movement of the flap side fairing is transferred via the fairing joint to the wing side fairing. The fairing joint has enough degrees of freedom to allow relative movements of the wing side fairing and the flap side fairing during movements of the flap.

According to an exemplary embodiment, the movable wing side fairing is mechanically coupled to the flap side fairing with the fairing joint. The movable wing side fairing may be mechanically coupled to the flap side fairing with a 5 degree of freedom joint.

The fairing joint may be configured such that it allows relative movements of the fairings in at least one or several or all of the following degrees of freedom:

in line of flight
in a vertical direction
around a vertical axis
around a first horizontal axis essentially directed in spanwise or lateral direction
a second horizontal axis essentially directed in line of flight.

The fairing joint may be configured such that it affects a common sideward movement of a rearward end portion of the wing side fairing and of a forward end portion of the flap side fairing.

The fairing joint may have five degrees of freedom.

The fairing joint may include a spherical bearing and a sliding bearing.

The spherical bearing may be mounted on one of the fairings and the sliding bearing is arranged between the spherical bearing and the other one of the fairings.

The sliding bearing may comprise a sliding pad for sliding in a plane. Alternatively, the sliding bearing comprises a piston slidable in a sliding bush and provides a further, preferably rotational, degree of freedom.

For example, the piston and/or the bush are mounted to the associated fairing in a manner rotatable about an axis essentially perpendicular to the sliding direction such as a horizontal axis essentially directed in the spanwise or lateral direction.

The wing side fairing unit may be configured such that a rear part of the wing side fairing to be engaged with the flap side fairing is movable in a limited predefined manner in a spanwise direction.

The wing side fairing mount may comprise a forward connecting mechanism configured to connect a forward part of the wing side fairing rotatably with at least one or with two degrees of freedom to the mounting and guiding mechanism.

The forward connecting mechanism may include a spherical bearing. The forward connecting mechanism may allow movement of a forward part of the wing side fairing in at least two degrees of freedom, especially by a rotation about a first axis that has at least a direction component in the vertical direction (e.g., the vertical direction is the lift direction of the wing) and by a rotation about a second axis extending or essentially extending in the flight direction.

The wing side fairing mount may comprise a rearward connecting mechanism configured to connect a rearward part of the wing side fairing such that it is movable in a spanwise direction.

The rearward connecting mechanism may include a swing strut. The rearward connecting mechanism may include a pair of parallel swing struts. The rearward connecting mechanism may include a tensile means, i.e., flexible means such as a cable or a chain. The rearward connecting mechanism may include an arrangement of a track and rollers or sliders. The rearward connecting mechanism may include an upper track and roller or slider arrangement and/or a lower track and roller or slider arrangement. The rearward connecting mechanism may include a track curved around a rotation axis of the forward connecting mechanism in combination with a set of rollers or sliders running on the track. The rearward connecting mechanism may include a linear bearing.

A forward end portion of the flap side fairing may engage into a rearward end portion of the wing side fairing in order to allow a telescopic and rotational relative movement of said fairings.

The fairing arrangement may further comprise a fixed front fairing unit configured to be rigidly fixed to the wing, wherein the wing side fairing unit is configured as intermediate movable wing side fairing unit arranged between fixed front fairing unit and the flap side fairing unit.

According to an exemplary embodiment, a high-lift system for an aircraft is provided having a high-lift mechanism including a flap to be arranged at a trailing edge of an aircraft wing and a mounting and guiding mechanism for the flap (also called flap support in the prior art), and a fairing arrangement according to any of the aforementioned embodiments.

According to an exemplary embodiment, an aircraft wing is provided comprising such a high-lift system and/or a fairing arrangement according to any of the aforementioned embodiments.

According to an exemplary embodiment, an aircraft is provided comprising a wing arrangement including such a wing and/or such a high-lift system and/or a fairing arrangement according to any of the aforementioned embodiments.

The disclosure lies on the technical field of aircraft high-lift systems and especially relates to fairings of such high-lift systems.

Exemplary embodiments propose improved fairing kinematics for a variable shape trailing edge.

Exemplary embodiments relate to a type of fairing arrangement that is kinematically configured to translate and rotate.

In known fairing solutions such as mentioned above, a forward part of the fairing is rigidly assembled to the wing and the aft part of the fairing has a hinged connection to a flap support beam.

Exemplary embodiments provide at least one, several or all of the following advantages:

- An interface of a rear part of the fairing and flap is much simpler;
- A lateral movement of the flap system can be compensated;
- A solution proposed by the exemplary embodiments may be a key enabler for a variable shape trailing edge functionality (VSTE) as demonstrated on eXtra performance Wing demonstrator, see (5) and (6);
- Ensures a good aerodynamic condition between forward and aft part of the fairing;
- The positional determination of the forward fairing is steered by the engagement of the forward fairing into the forward fairing; and,
- Also more or fully sealed conditions in all high lift configurations can be realized The fairing kinematic principle according to exemplary embodiments provide at least one, several or all of the following benefits:

- Minimizing the aerodynamic drag in high-speed and low-speed operation;
- Minimizing the noise in take-off and landing configuration;
- No side load stay and reinforcement frames are necessary, or at least they are smaller;
- Lighter compared to previous solutions;
- Only few parts are necessary for the kinematics, this reduces the complexity in failure cases;
- The structure weight;
- With a rotational forward movable fairing with a coupling joint of 5 DoF the kinematics;
- Isostatic, with exactly determined positions and load paths;
- The elastomer sealing can be avoided or compression significantly reduced; and,
- Fairing vibration and fatigue issues can be reduced.

Exemplary embodiments are related to an aircraft wing, in the area of high-lift devices like flaps. Flaps are normally mounted on flap support structures, which are on most aircrafts covered by fairings. Exemplary embodiments provide a mechanism, which is used to deploy fairing-movable-parts with a simple and compact kinematics with a lot of benefits on aircraft level. Exemplary embodiments relate to a high-lift trailing edge device, where each flap is supported by two or more tracks. For aerodynamic reasons the tracks are covered with a fairing arrangement. During deployment and retraction of the flaps, fairings of the fairing arrangement are driven by the motion of the flap. As in most commercial airliners, a wing side fairing of the fairing arrangement is not rigidly fixed to the wing, especially the wing box, but is mounted such that a rear end portion thereof can move laterally. Especially, the wing side fairing can conduct a rotational movement about a vertical axis.

According to an exemplary embodiment, a fairing, which comprises a forward movable fairing (referred to as wing side fairing), and a rearward fairing attached to the flap (referred to as flap side fairing) are disclosed. The forward-movable-fairing (FMF) is rotating around a vertical axis, which is mounted on the flap support structure, but this motion is not limited to rotations for the forward fairing.

According to an exemplary embodiment, the rearward fairing (RF) is directly attached to the flap, so just follows the flap motion. The rotation or other movement of the forward movable fairing (FMF) will be controlled by the rearward fairing (RF) with a 5 degree of freedom joint (5 DoF). The principle only needs very few parts and also enables high-lift and high-speed operation (VC/DFS) without creating significant steps in the split area during operation.

According to an exemplary embodiment, the mechanism principle works such that a spherical bearing (3 DoF) is fixedly attached to the movable wing side fairing, and a sliding pad (with 2 DoF) is fixed to the rearward flap side fairing. Overall, the degrees-of-freedom at the joint are in sum 5.

Another possibility is to invert the location of the spherical bearing to the rearward flap side fairing (3 DoF) and fix it to this location to the structure of the flap side fairing. In this case 2 further DoF are provided in the movable wing side fairing, which can be done by a sliding bearing designed as pads (2 DoF) or two translating joints (2 DoF), or one translating joint and adjacent rotational link (2 DoF), or two adjacent rotational links (2 DoF).

A benefit of the exemplary embodiments is that the rearward fairing (RF—flap side fairing) controls the lateral motion of the forward fairing (wing side fairing) in high-lift and high-speed operation (VC/DFS) by minimizing the steps out of wind in the split line.

Furthermore, an exemplary embodiment enables a very good sealing high-speed and low speed, even if a lot of fowler-motion is implemented in the flap kinematics. The forward-movable-fairing loads are also transferred via the 5 DoF-joint to the rearward fairing.

Between the flap and the flap side fairing no elastomer sealing is required, because the two parts are attached to each other; this stiffens the structure and reduces the overall weight of the fairing. In use, the flap side fairing of the fairing arrangement is attached to the flap which simplifies the fairing kinematics considerably (no need of operating rod, structure frames, side load stay, and a lot of sealings). Also a very good sealing is provided in high-speed and low-speed in the split area, without huge steps.

According to an exemplary embodiment, a location of the 5 DoF joint under a flap-support-structure (FSS, referred to as mounting and guiding mechanism above) is also beneficial in terms of minimizing the relative motions, between the wing side and the flap side fairing. Especially for the system installation (SI) routing, which can be directly fixed to the joint elements and avoids an entrapment of the wires in the fairing split lines.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
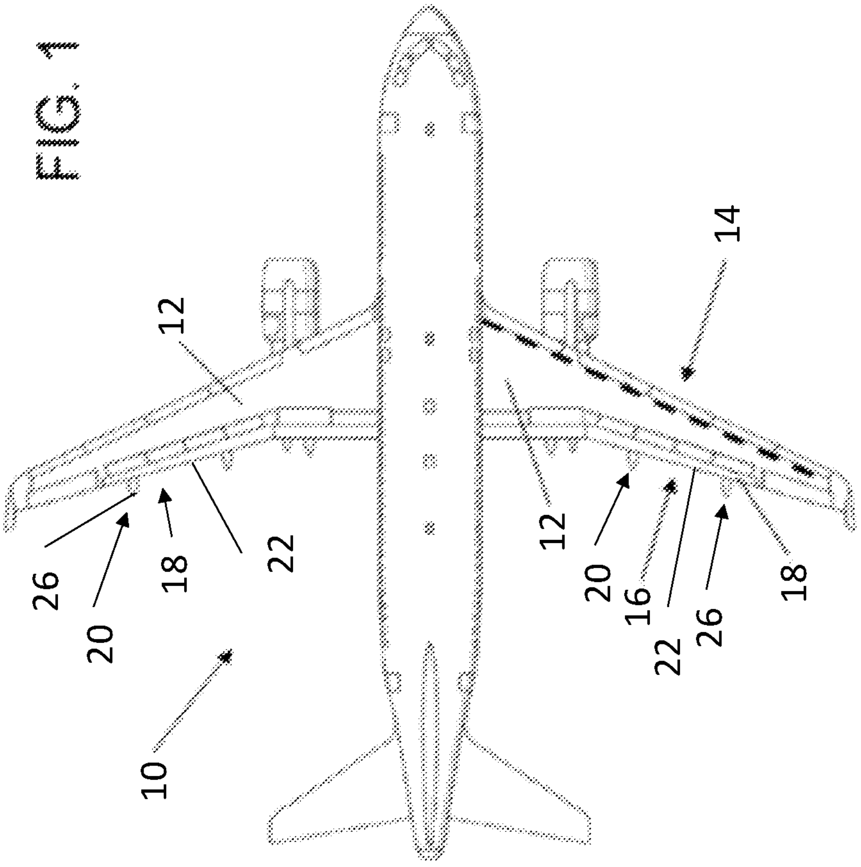
FIG. 1 is a plan view of an aircraft.

An aircraft 10 as shown in FIG. 1 has a pair of aircraft wings 12 extending from a fuselage. Each wing 12 has a leading edge 14 and a trailing edge 16. High-lift systems 18 are arranged at the trailing edge 16. Each high-lift system 18 comprises a high-lift mechanism 20 and fairing arrangements 26. The high-lift mechanism 20 includes a flap 22 and several mounting and guiding mechanisms 24 for mounting the flap 22 at the trailing edge 16 and guiding a movement of the flap 22. The mounting and guiding mechanism 24 serves as flap support. In some embodiments, the mounting and guiding mechanism 24 includes a flap track for guiding the movement of the flap. Any of the mounting and guiding mechanisms 24 is aerodynamically covered by a fairing arrangement 26.

According to an exemplary embodiment, the wing 12 has a variable shape trailing edge functionality (VSTE) where the trailing edge 16 has a variable shape and can be deformed for different flight situations.

Figure 2C:
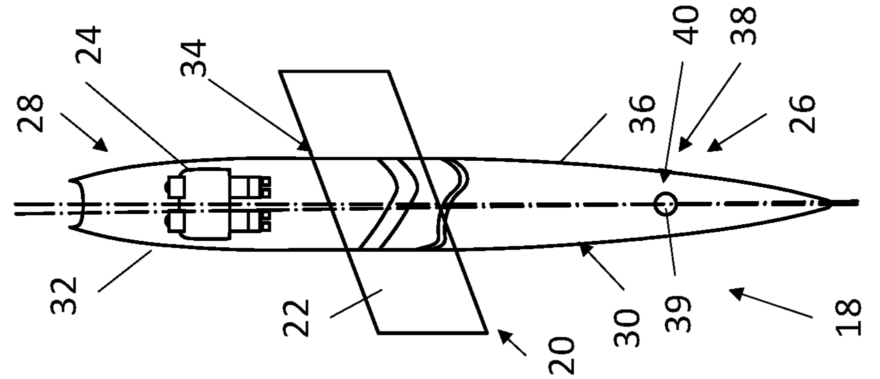
FIG. 2*c* is a similar view as in FIGS. 2*a* and 2*b* of the fairing arrangement in a negative variable shape trailing edge configuration.
Figure 2B:
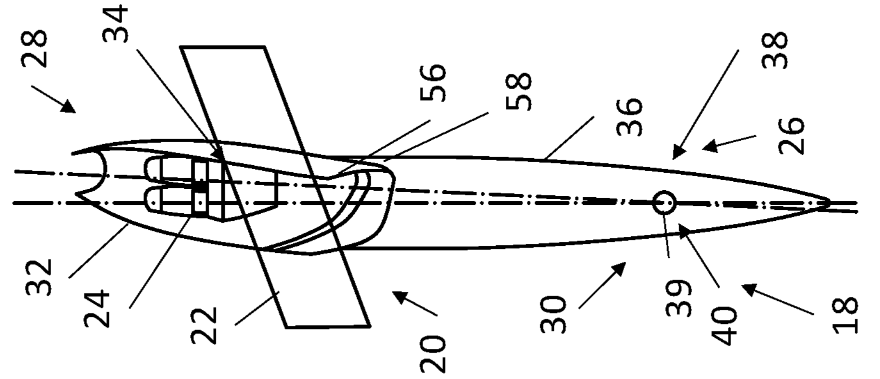
FIG. 2*b* is a similar view as in FIG. 2*a* of the fairing arrangement in a high-lift configuration (flap fully extended).
Figure 2A:
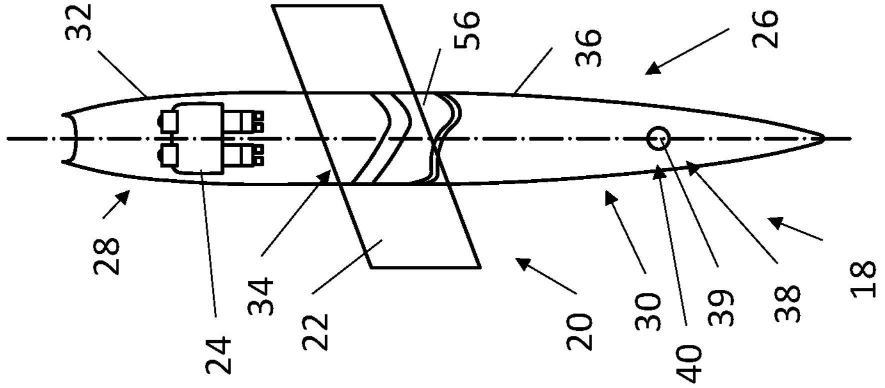
FIG. 2*a* is a top plan view of a fairing arrangement of the aircraft in a clean configuration (flap retracted).
Figures 3A, 3B, 3C:
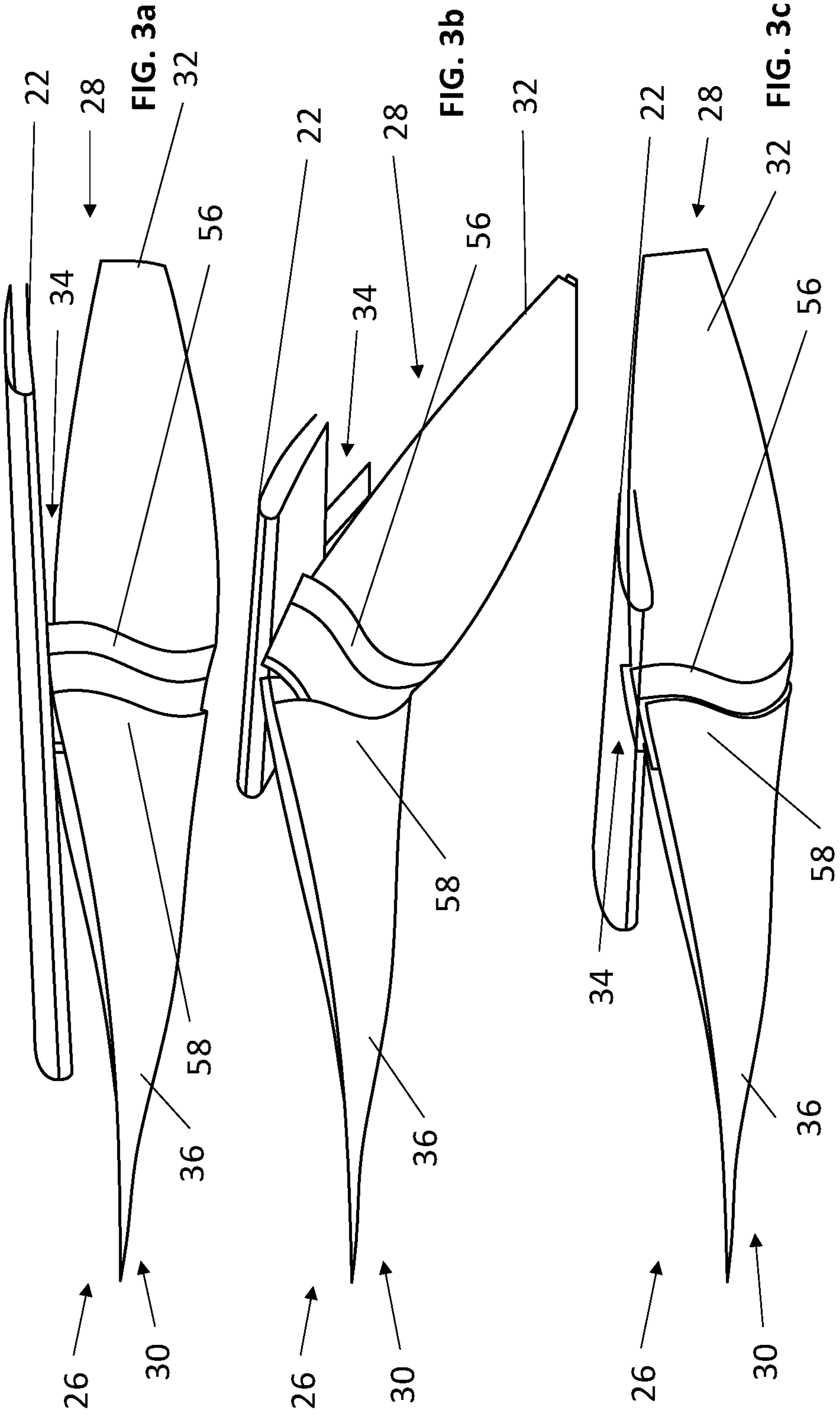
FIG. 3*a* is a side view of the fairing arrangement of the aircraft in the clean configuration (flap retracted).
FIG. 3*b* is a similar view as in FIG. 3*a* of the fairing arrangement in a high-lift configuration (flap fully extended).
FIG. 3*c* is a similar view as in FIGS. 3*a* and 3*b* of the fairing arrangement in a negative variable shape trailing edge configuration.

FIGS. 2*a*, 2*b*, 2*c*, 3*a*, 3*b*, and 3*c* show an embodiment of the fairing arrangement 26 in different flap positions, wherein FIGS. 2*a* and 3*a* show a clean configuration wherein the flap 22 is retracted, FIGS. 2*b* and 3*c* show a high-lift configuration where the flap 22 is fully extended, and FIGS. 2*c* and 3*c* show a negative VSTE configuration.

Referring to FIGS. 2*a*-2*c* and 3*a*-3*c*, there is shown the fairing arrangement 26 for the high-lift mechanism 20 of the aircraft 10. The high-lift mechanism 20 includes the flap 22 to be arranged at a trailing edge 16 of the aircraft wing 12 and the mounting and guiding mechanism 24 for the flap 22.

The fairing arrangement 26 comprises a flap side fairing unit 28 and a wing side fairing unit 30. As seen in flight direction of the aircraft 10, the flap side fairing unit 28 is an aft fairing unit and the wing side fairing unit is a forward fairing unit.

The flap side fairing unit 28 comprises a flap side fairing 32 for covering an aft part of the mounting and guiding mechanism 24 and a flap side fairing mount 34 for mounting the flap side fairing 32 to the flap 22. In the embodiments shown, the flap side fairing mount 34 is configured to mount the flap side fairing 32 rigidly to the flap 22. For example, the shell of the flap side fairing 32 may be mounted with usual bolts, rivets or fasteners (not shown) to the flap 22.

The wing side fairing unit 30 comprises a wing side fairing 36 for covering a forward part of the mounting and guiding mechanism 24 and a wing side fairing mount 38 for mounting the wing side fairing 36 to the wing. The wing side fairing mount 38 is configured to movably connect the wing side fairing 36 to the wing 12 or the front part of the mounting and guiding mechanism 24 which is attached to the wing 12. In some embodiments (not shown), the wing side fairing mount 38 connects the wing side fairing 36 such that it is shiftable in a lateral direction.

According to an exemplary embodiment, the wing side fairing mount 38 is configured to connect the wing side fairing 36 to the wing 12 or the front part of the mounting and guiding mechanism 24 which is attached to the wing 12 such that it is rotatable around an essentially vertical axis 39 directed at least with its largest direction component in a vertical direction. Here, the vertical direction is the direction essentially perpendicular to the spanwise and chordwise directions of the wing 12, i.e., the direction of lift.

Although not shown in FIGS. 1 to 10, the fairing arrangement 36 comprises a fairing joint 80 for mechanically coupling the flap side fairing 32 and the wing side fairing such that a movement of the flap side fairing controls or drives the movement of the wing side fairing 36. Especially, a movement of the flap side fairing 36 together with the moved flap 22 is transferred via the fairing joint to a lateral movement, more preferred the rotation about the essentially vertical axis 39, of the wing side fairing 36. Further details and embodiments of the fairing joint 80 are explained below referring to FIGS. 11 to 19. The flap side fairing 32 is in all configurations and coupled via the fairing joint with the wing side fairing 36. The fairing joint 80 is configured in a way that the lateral movement of the flap side fairing 32 guides the lateral or rotational position of the wing side fairing 36.

As further shown in FIGS. 2*a* to 3*c*, a U-channel shaped forward end portion 56 of the flap side fairing 32 extends into a U-channel shaped rearward end portion 58 of the wing side fairing 36 in order to allow a telescopic and rotational relative movement of said fairings. In some embodiments, the extension and design of the end portions 56, 58 is such that they extend into each other in all flap configurations. The FIGS. 3*a* to 3*c* show the high lift configurations in a side view.

FIGS. 4 to 19 show the fairing arrangement 26 according to exemplary embodiments. While FIGS. 4 to 10 show embodiments with different designs of the wing side fairing mount 38, FIGS. 11 to 19 show embodiments with different designs of the fairing joint 80.

In the following, the exemplary embodiment of the wing side fairing mount 38 are described referring to FIGS. 4 to 10. As notable therefrom, the wing side fairing mount 38 comprises a forward connecting mechanism 40 and a rearward connecting mechanism 42.

The forward connecting mechanism 40 is configured to connect a forward part of the wing side fairing 36 rotatably with one degree of freedom or with two degrees of freedom to the mounting and guiding mechanism 24.

In an embodiment not shown, the forward connecting mechanism 40 just has a simple bearing allowing rotation of the wing side fairing around the essentially vertical axis 39.

In the exemplary embodiments shown in FIGS. 4 to 10 the forward connecting mechanism is essentially comprised of a bearing allowing rotation about the essentially vertical axis 39 and further allowing rotation about a second axis 44 perpendicular to this essentially vertical axis 39. For example, the bearing is a first spherical bearing 46. In some embodiments, the first spherical bearing 46 includes a ball portion 48, a shaft portion and a spherical bearing shell 50. A forward part of the fairing shell of the wing side fairing 36 is hold on ends of the shaft portion 48. The ball portion 48 is integrally formed with or rigidly connected to a center of the shaft portion 48 and is hold in the spherical bearing shell 50. The spherical bearing shell is fixed to a track member 52 of the mounting and guiding mechanism 24 which itself is, in use, fixed to the structure of the wing 12.

The rearward connecting mechanism 42 is configured to allow a movement of the rearward part of the wing side fairing 36 in a spanwise direction during the rotational movement about the essentially vertical axis 39. Several possible designs of the rearward connecting mechanism 42 are provided in the first to fourth embodiment as shown in FIGS. 4 to 10.

Figure 4:
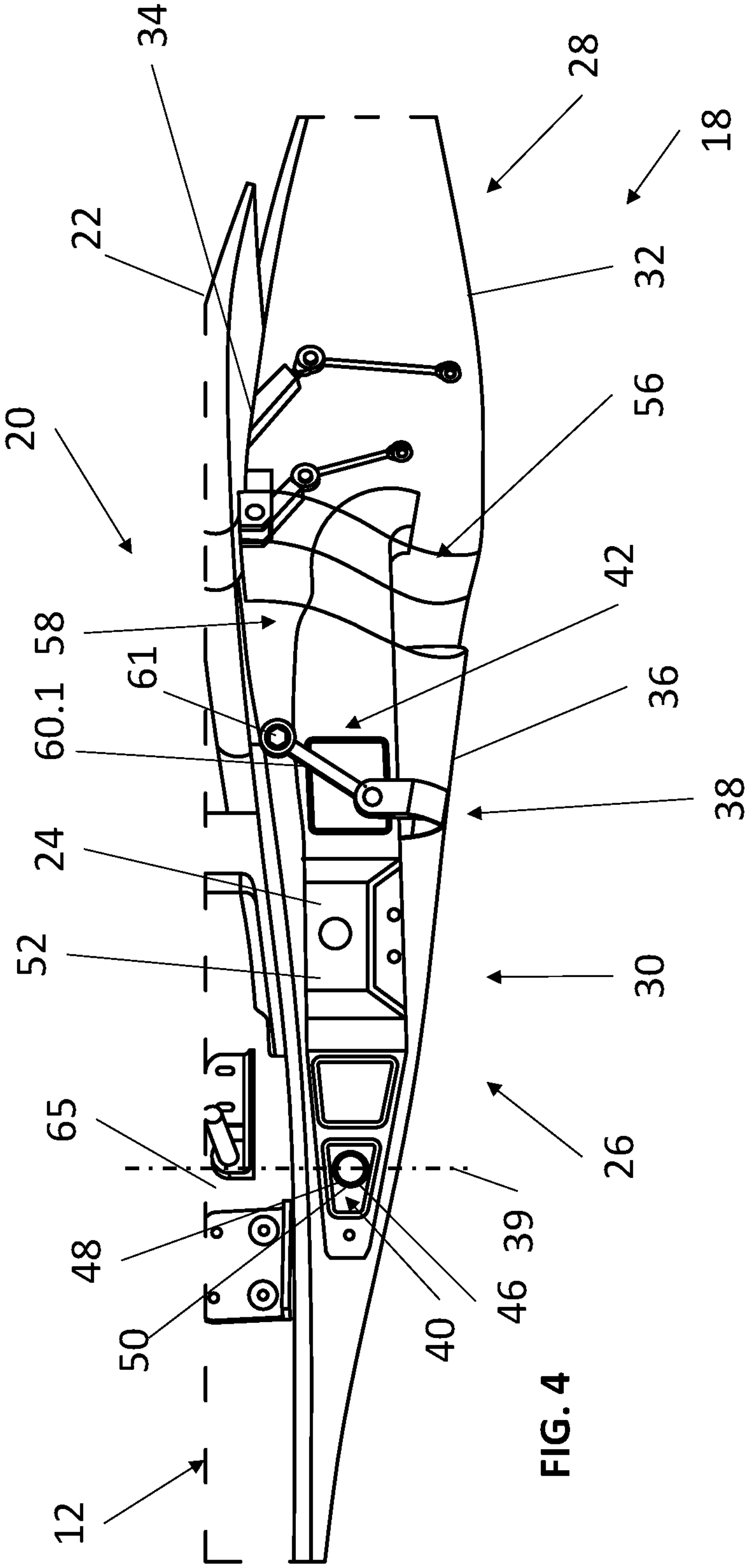
FIG. 4 is a side view of a high-lift system including an exemplary embodiment of a fairing arrangement wherein fairings thereof are shown partly broken away for illustrative purposes.
Figure 5:
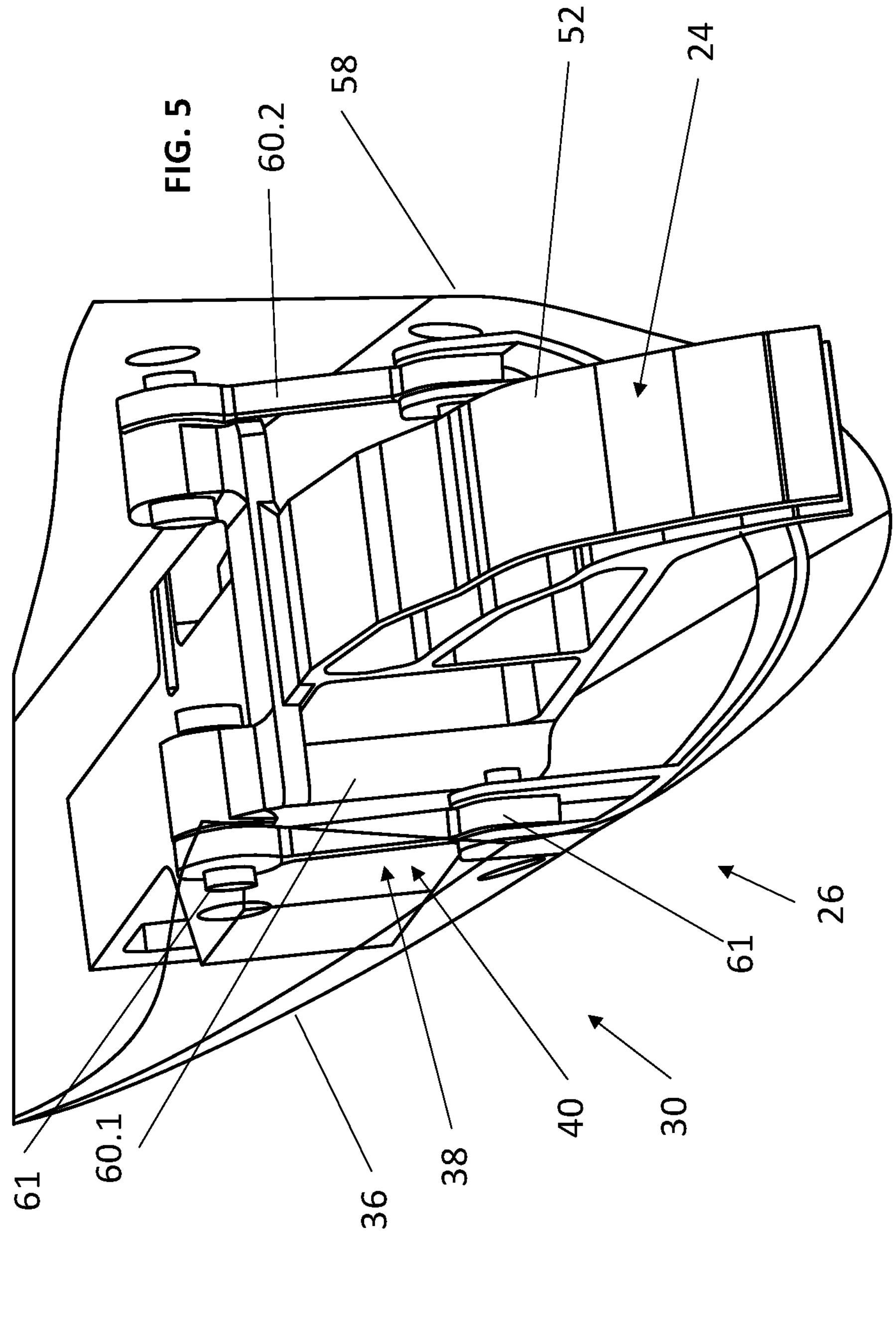
FIG. 5 is a first perspective rear and side view of a wing side fairing unit of the fairing arrangement according to an exemplary embodiment.
Figure 6:
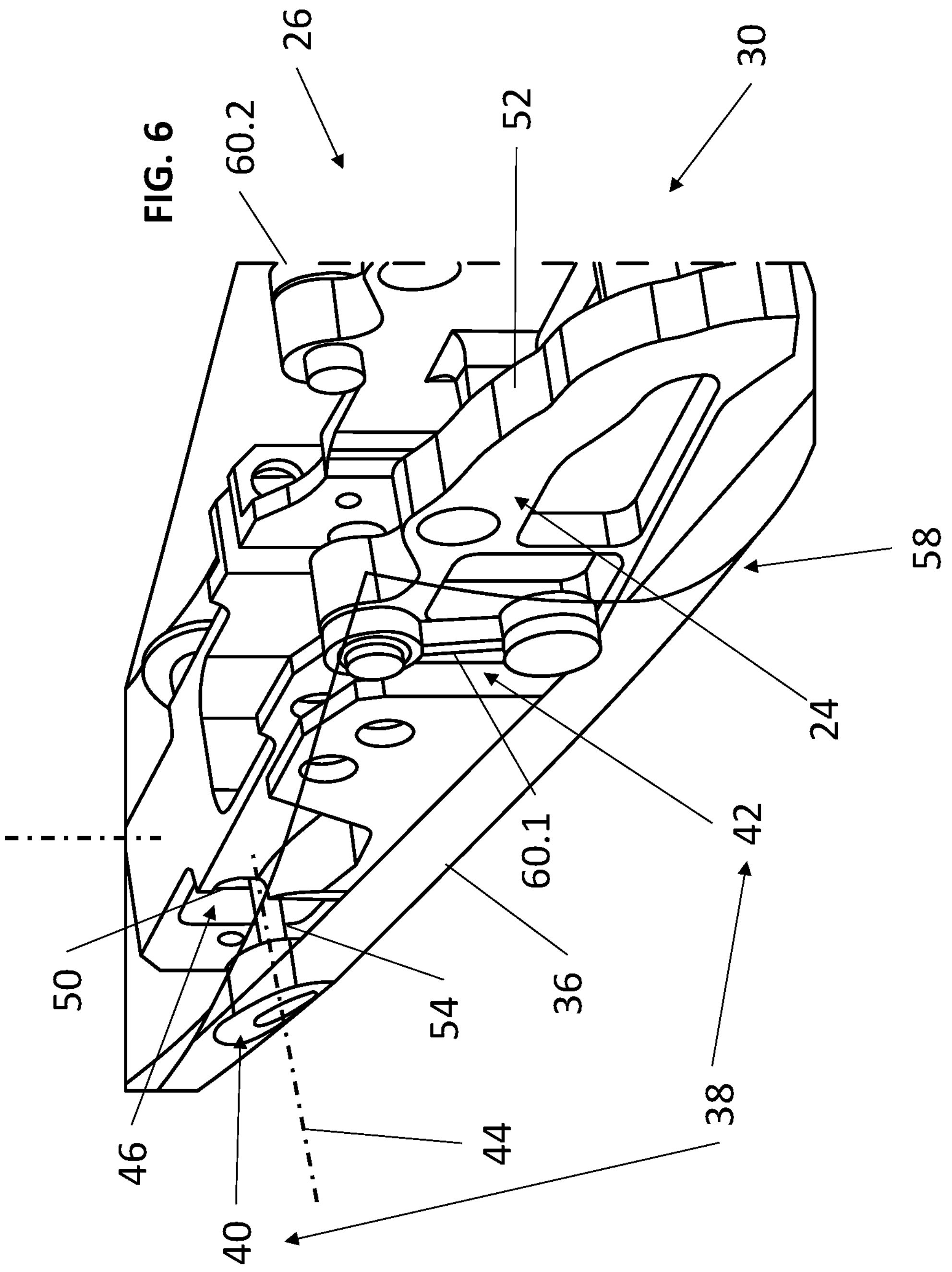
FIG. 6 is a second perspective rear and side view of the wing side fairing unit of the fairing arrangement according to an exemplary embodiment.

In an exemplary embodiment as shown in FIGS. 4 to 6, the rearward connecting mechanism 42 comprises a pair of parallel swing struts 60.1, 60.2. Hence, in the first embodiment, the wing side fairing 36, i.e., a forward fairing of the fairing arrangement 26, is in the rotational axis connected to the wing structure 65 by the spherical bearing 46. In an aft area of the wing side fairing 36 the two parallel fairing struts 60.1, 60.2 are located to lock the rotational degree of freedom around an axis in line of flight and around an axis in spanwise direction. The resulting movement is not a pure rotation around the vertical axis 39 but more a complex combination of rotations. The required rotation of the wing side fairing 36 is limited to just a few degrees and the here described movement is working well as a design solution.

The swing struts 60.1, 60.2 are equipped with multi-axis bearings such as spherical bearings 61 at their ends in order to connect the strut ends movably to the track member 52 and the wing side fairing 36, respectively.

As a variation (not shown) the struts 60.1, 60.2 can be replaced by flexible tensile means or flexible elements like steel cables in combination with a roller or linear bearing below the track member 52.

Figure 7:
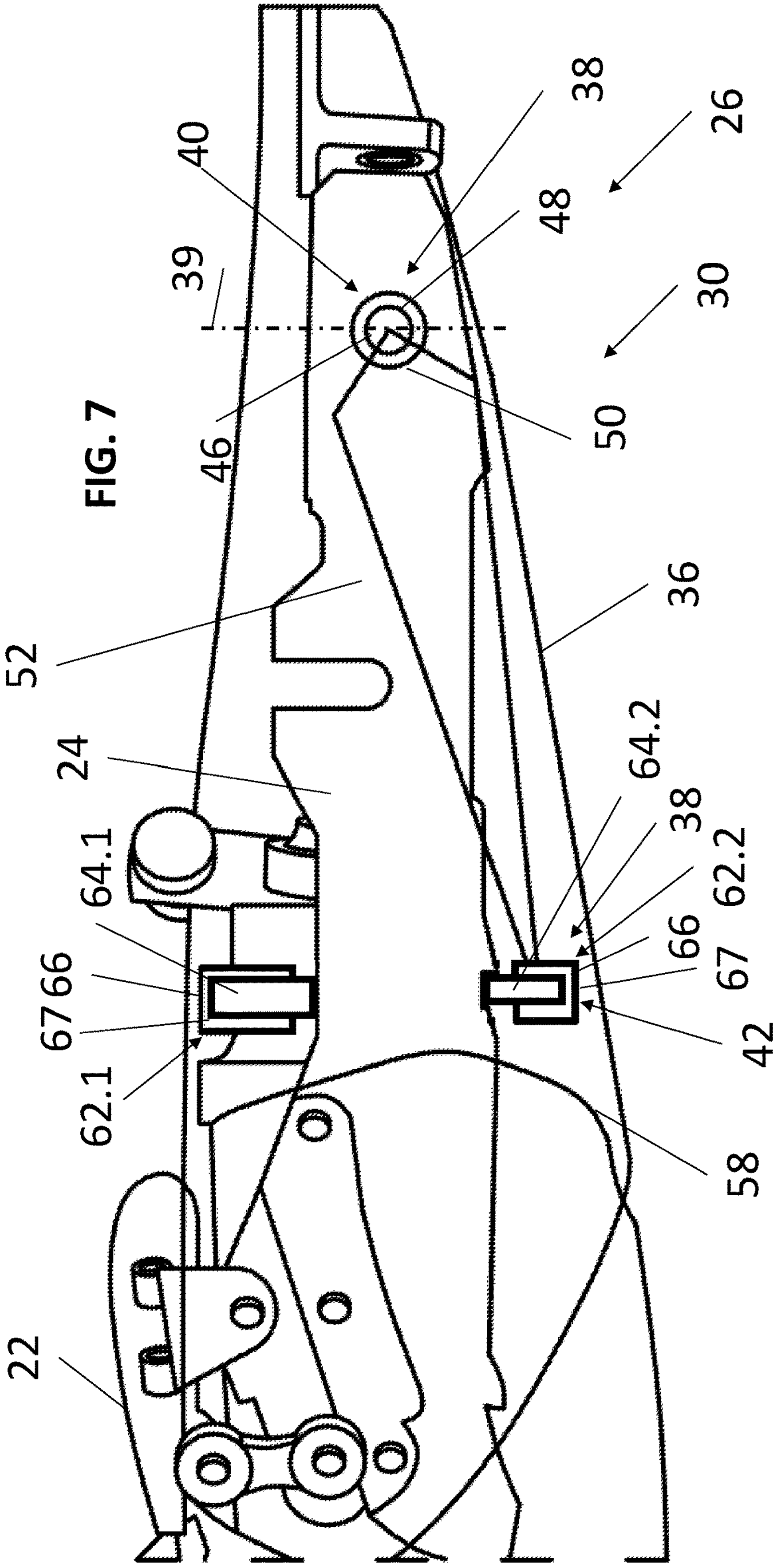
FIG. 7 is a side view of the wing side fairing unit of the fairing arrangement according to an exemplary embodiment, wherein a fairing shell is shown partly broken away for illustrative purposes.
Figure 8:
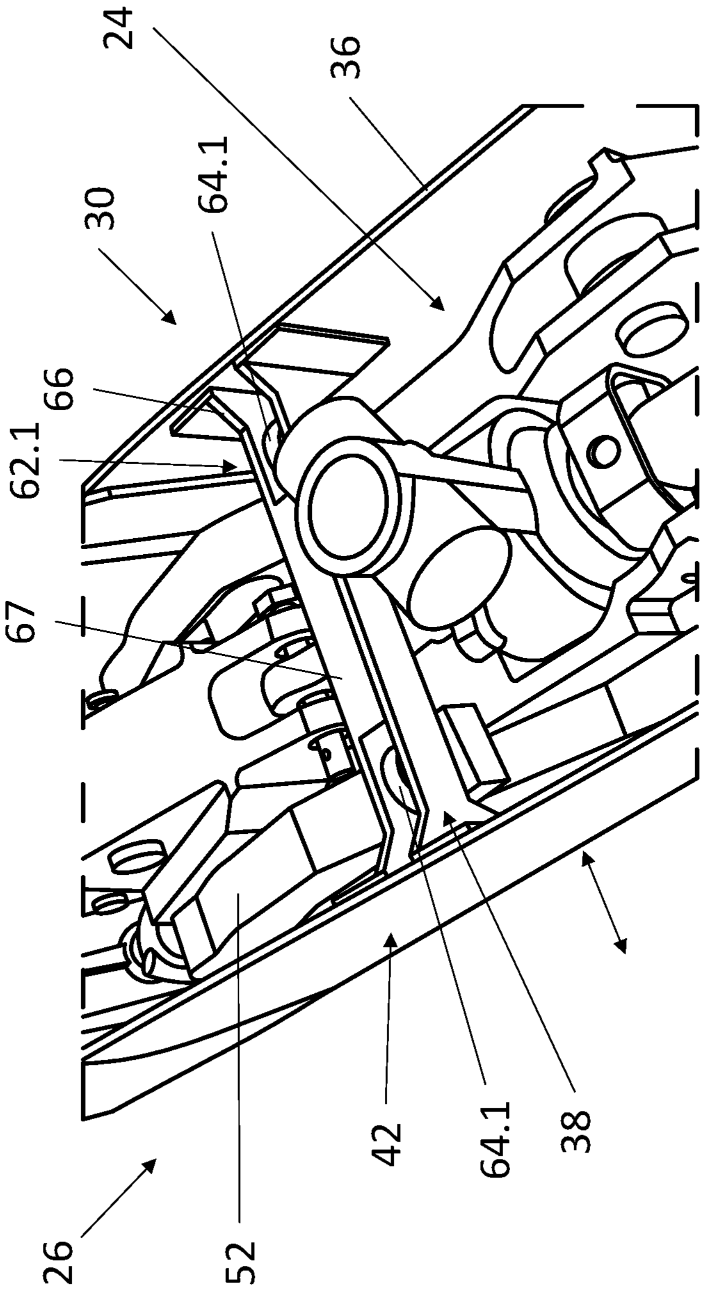
FIG. 8 is a perspective view seen from above and a side of the wing side fairing unit of the fairing arrangement according to an exemplary embodiment.

In an exemplary embodiment shown in FIGS. 7 and 8, the rearward connecting mechanism 42 comprises an upper track and roller arrangement 62.1 and a lower track and roller arrangement 62.2. The track and roller arrangements 62.1, 62.2 comprise rollers 64.1, 64.2 rotatably mounted on a roller support 66, e.g., a fairing bridge 67, at an inside the wing side fairing 36 and allowing movement of the aft part of the wing side fairing 36 in the spanwise direction. In a variant not shown, sliders are used instead of some or all of the rollers 64.1, 64.2. In the second embodiment, the wing side fairing 36 is connected to the wing structure 65 with the spherical bearing 46 as explained above and a combination of two rollers 64.1 above the track member 52 and two rollers 64.2 below the track member 52. As a variation of this solution which is illustrated schematically in FIG. 10 for the fourth embodiment, also linear bearings 68 can be used instead of rollers 64.1, 64.2.

Figure 9:
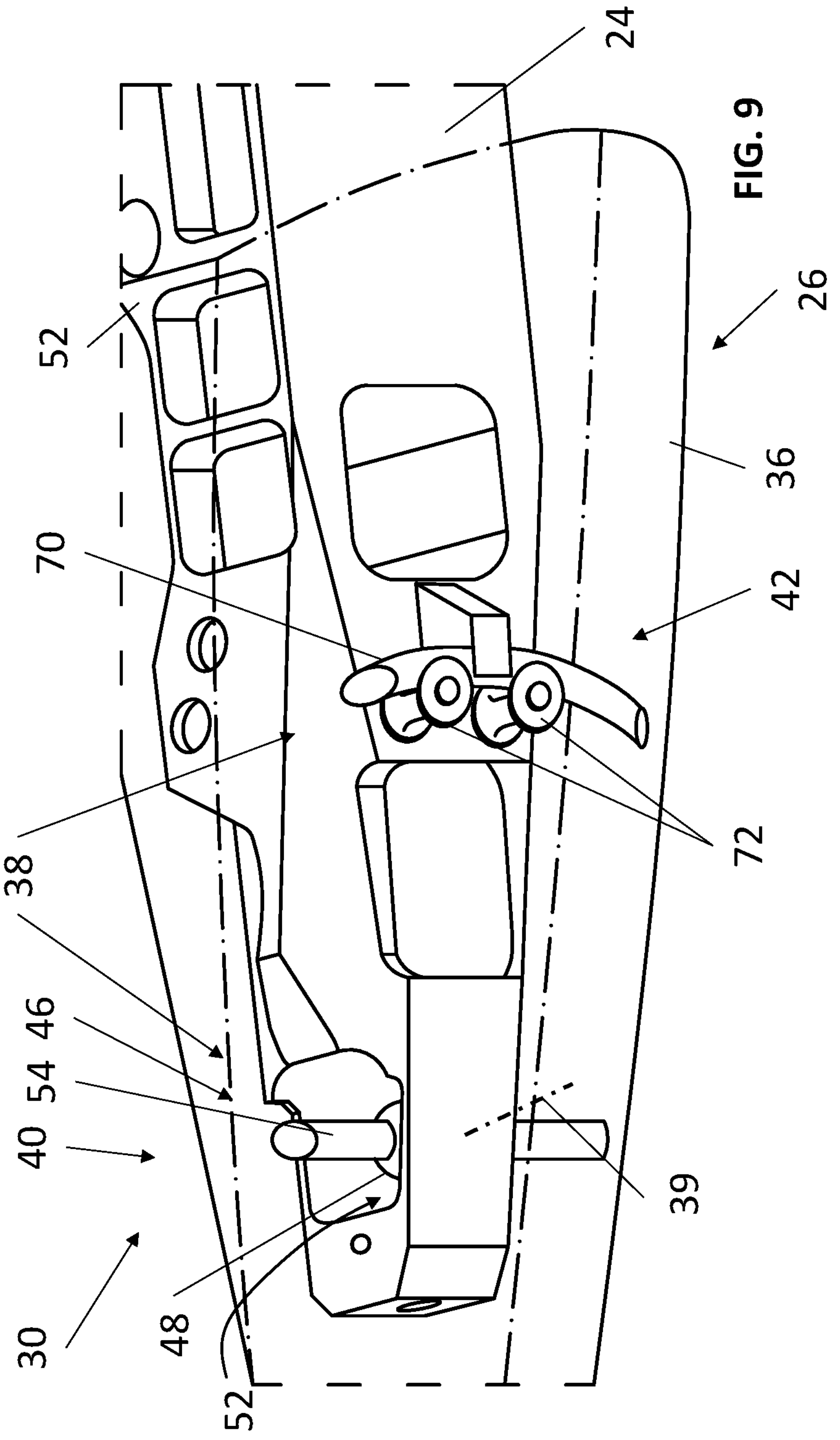
FIG. 9 is a perspective view seen from below and from a side of the wing side fairing unit of the fairing arrangement according to an exemplary embodiment in which a fairing shell is indicated in broken lines only.

In an exemplary embodiment shown in FIG. 9, the rearward connecting mechanism 42 comprises a curved track 70 and rollers 72 running on that curved track 70. In the embodiment shown, the curved track 70 is fixed inside the wing side fairing 36 and the rollers 72 are rotatably mounted on a bottom surface of the mounting and guiding mechanism 24, especially the track member 52. In other embodiments (not shown), the rollers 72 are rotatably mounted in the wing side fairing 30 while the track 70 is mounted on the mounting and guiding mechanism 24. In the third embodiment. the aft guidance of the wing side fairing 36 is realized by a set of rollers 72 running on the curved track 70 with the track center point in line with the vertical rotation axis 39.

Figure 10:
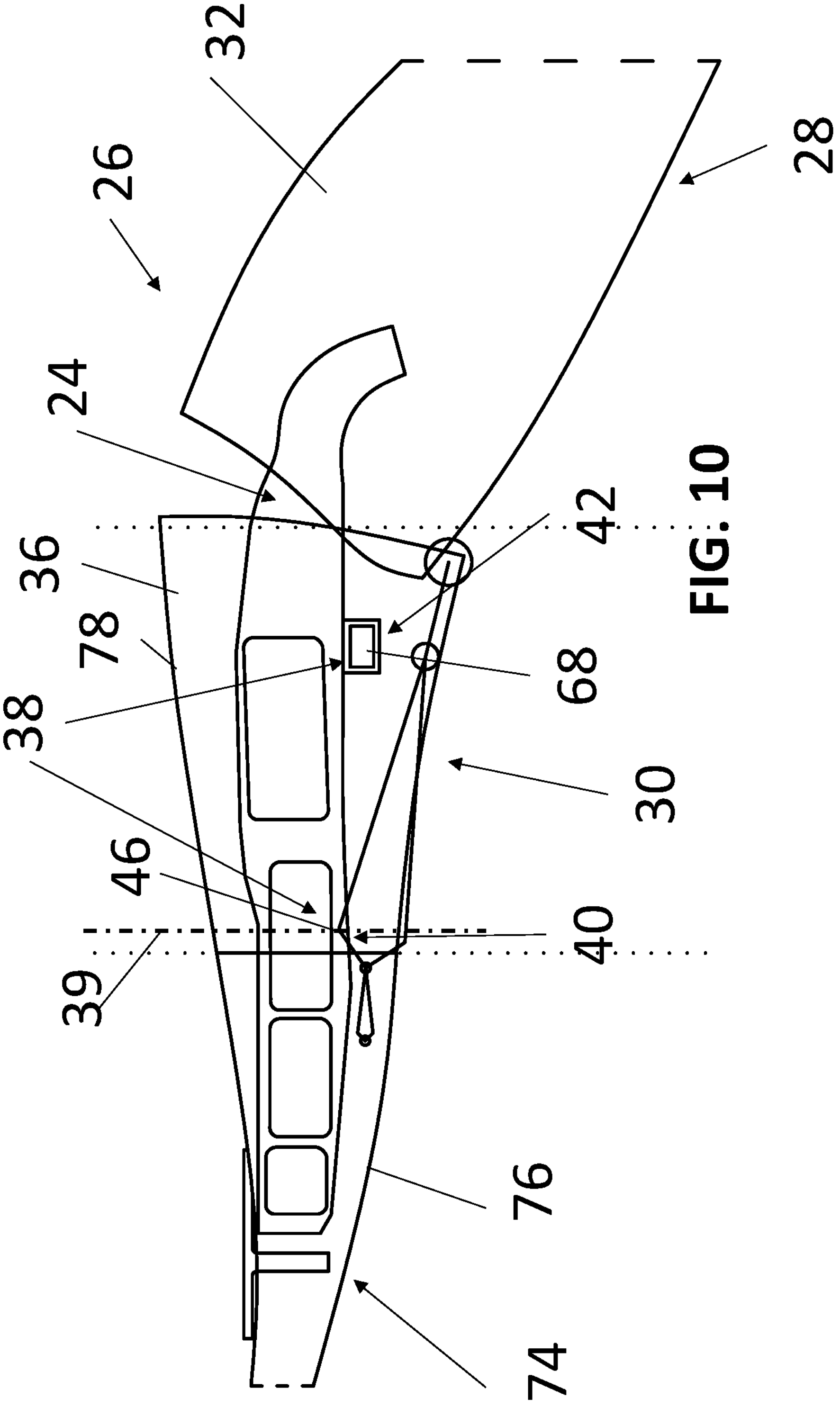
FIG. 10 is a side view of the fairing arrangement according to an exemplary embodiment.

In an exemplary embodiment shown in FIG. 10, an alternative arrangement of the fairings 36, 32 is shown. Here, the fairing arrangement 26 comprises a fixed front fairing unit 74 configured to be rigidly fixed to the wing 12, wherein the wing side fairing unit 30 is configured as intermediate movable wing side fairing unit arranged between fixed front fairing unit 74 and the flap side fairing unit 28.

In other words, a forward fairing for covering a front part of the mounting and guiding mechanism 24 is split into a fixed fairing 76 and the wing side fairing 36, here configured as an intermediate fairing 78. The intermediate fairing 78 is mounted with the forward connecting mechanism 40 and the rearward connecting mechanism 42. In the fourth embodiment, the rearward connecting mechanism 42 includes the linear bearing 68 allowing movement of the aft part of the intermediate fairing 78 in spanwise direction for rotation of this intermediate bearing 78 about the essentially vertical axis 39, but of course the rearward connecting mechanism 42 could also have the design of any of the other embodiments as explained above.

In the following, exemplary embodiment of the fairing joint 80 are explained referring to FIGS. 11 to 19. As mentioned above, the fairing joint 80 is configured to connect the flap side fairing 32 and the wing side fairing 36 such that relative movements of the fairings 32, 36 during flap extension and retraction are possible and such that a rearward end portion 58 of the wing side fairing 36 moves laterally to follow a corresponding movement of the forward end portion 56 of the flap side fairing 32.

Depending on the kinematics of the flap movement, different movements of the wing side fairing 32 are possible. Depending on the kinematics, the fairing joint is configured such that it allows relative movements of the fairings 36, 32 in different degrees of freedom such as

- in line of flight
- in a vertical direction
- around a vertical axis
- around a first horizontal axis essentially directed in spanwise direction
- a second horizontal axis essentially directed in line of flight.

In the exemplary embodiments shown, where the wing side fairing movement is a rotational movement around the axis 39 with further possible movements as mentioned above, the fairing joint 80 is configured as a 5 degree of freedom joint e.g., providing all of the above mentioned degrees of freedom. Further, the fairing joint couples the fairings 32, 36 in order to affect a common sideward movement of the rearward end portion 58 of the wing side fairing 36 and of the forward end portion 56 of the flap side fairing 32.

In some exemplary embodiments, the fairing joint 80 comprises a spherical bearing and a sliding bearing 84. The spherical bearing of the fairing joint 80 is referred to as second spherical bearing 82 in order to distinguish it from the spherical bearing 46 of the forward connecting mechanism. The second spherical bearing 82 is mounted on one of the fairings 36, 32 and the sliding bearing 84 is arranged between the second spherical bearing 82 and the other one of the fairings 36, 32. In some embodiments, the sliding bearing 84 comprises a sliding pad 86 for sliding in a plane. In some embodiments, the sliding bearing 84 comprises a piston 88 slidable in a sliding bush 90. The piston 88 and/or the bush 90 are mounted to the associated fairing 36, 32 such that they can rotate about an axis that is essentially perpendicular to the sliding direction.

Figure 11:
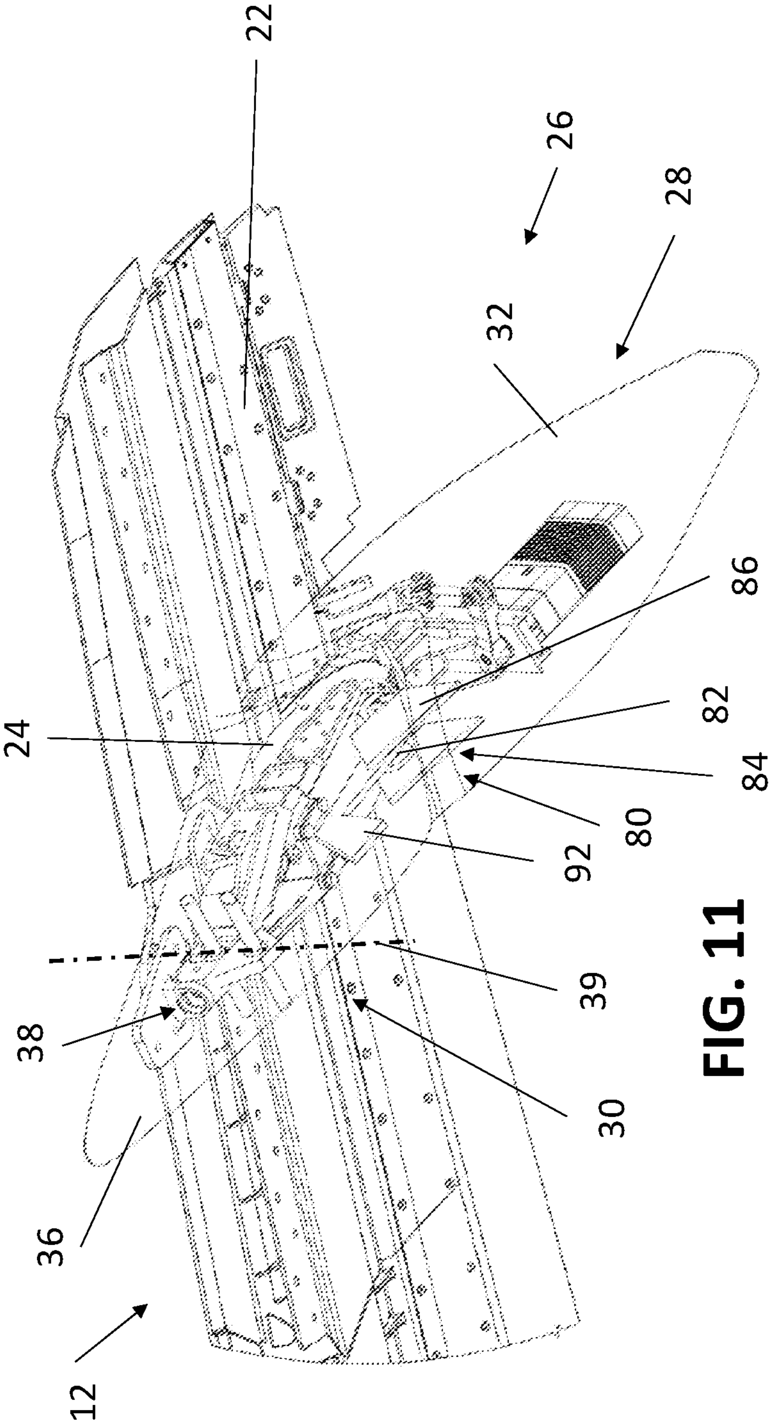
FIG. 11 is a partly transparent perspective view of the fairing arrangement according to an exemplary embodiment in an extended state.
Figure 12:
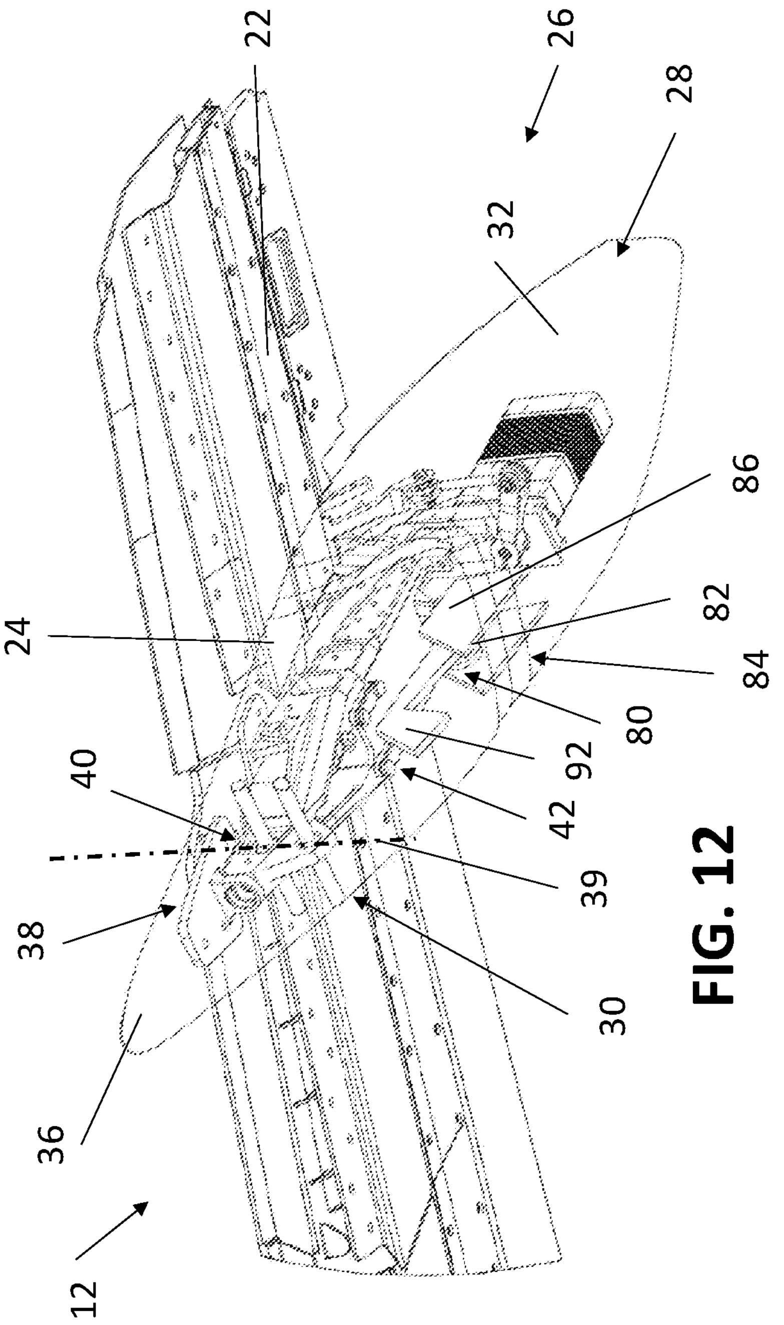
FIG. 12 is a partly transparent perspective view of the fairing arrangement according an exemplary embodiment in a retracted state.
Figure 13:
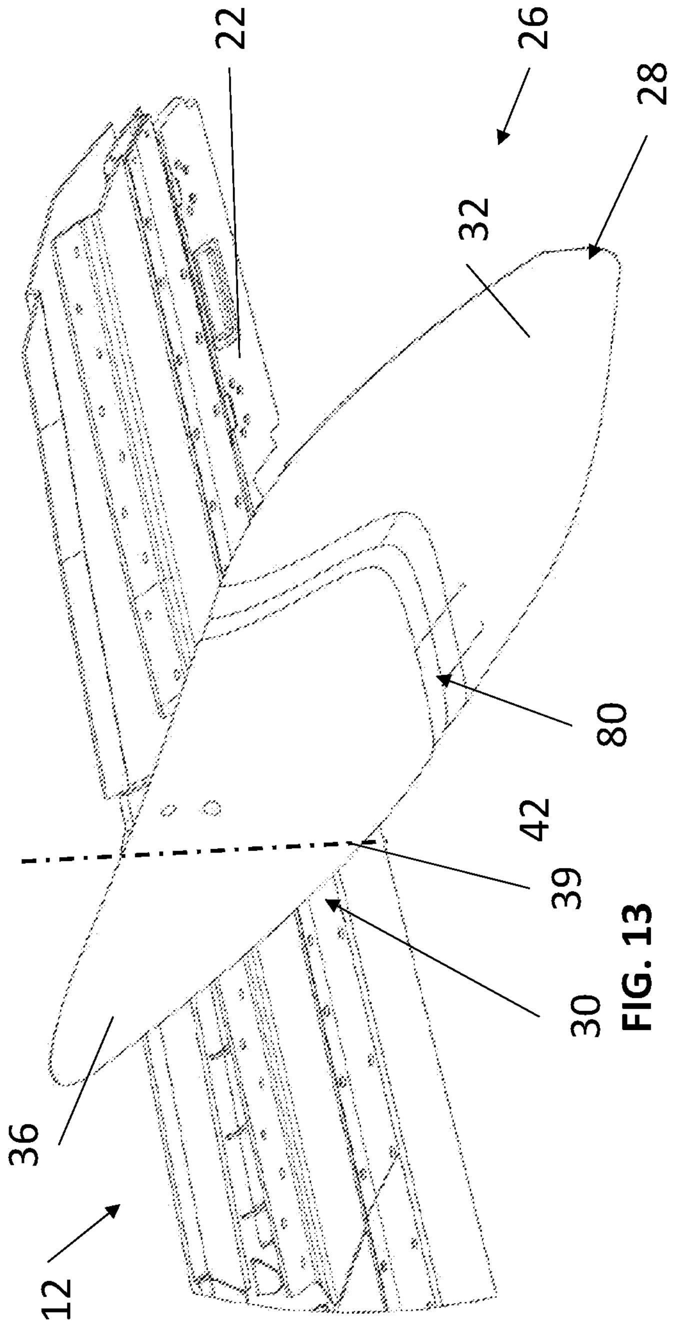
FIG. 13 is a perspective outer view of the fairing arrangement according to an exemplary embodiment in the retracted state.
Figure 14:
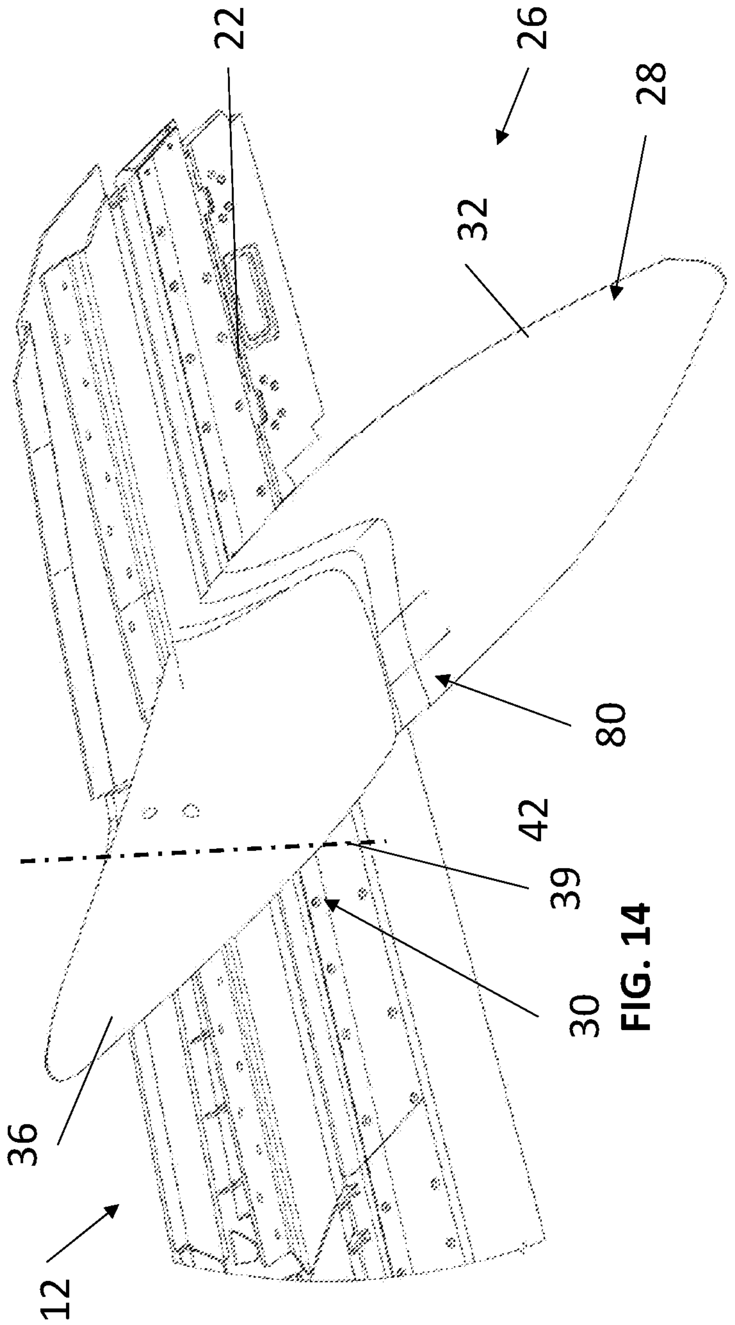
FIG. 14 is a perspective outer view of the fairing arrangement according to an exemplary embodiment in the extended state.

In an exemplary embodiment shown in FIGS. 11 to 14, the second spherical bearing 82 with three degrees of freedom is fixed to the wing side fairing 36. As explained above with reference to the first spherical bearing, a spherical bearing typically has, as first and second bearing elements a ball portion and a bearing shell. One of these bearing elements is connected to the wing side fearing 36, and the other of these bearing elements is connected to the sliding bearing 84. Especially, the wing side fairing 36 has a cantilever arm 92 for holding the first bearing element of the second spherical bearing 80. Sliding pads 86 with two degrees of freedom are fixed inside the flap side fairing 32 and configured such that they can slide in a plane relative to the second bearing element of the spherical bearing 80. FIGS. 11 and 14 show the extended state where the flap 22 is extended, while FIGS. 12 and 13 show the retracted state.

Figure 15:
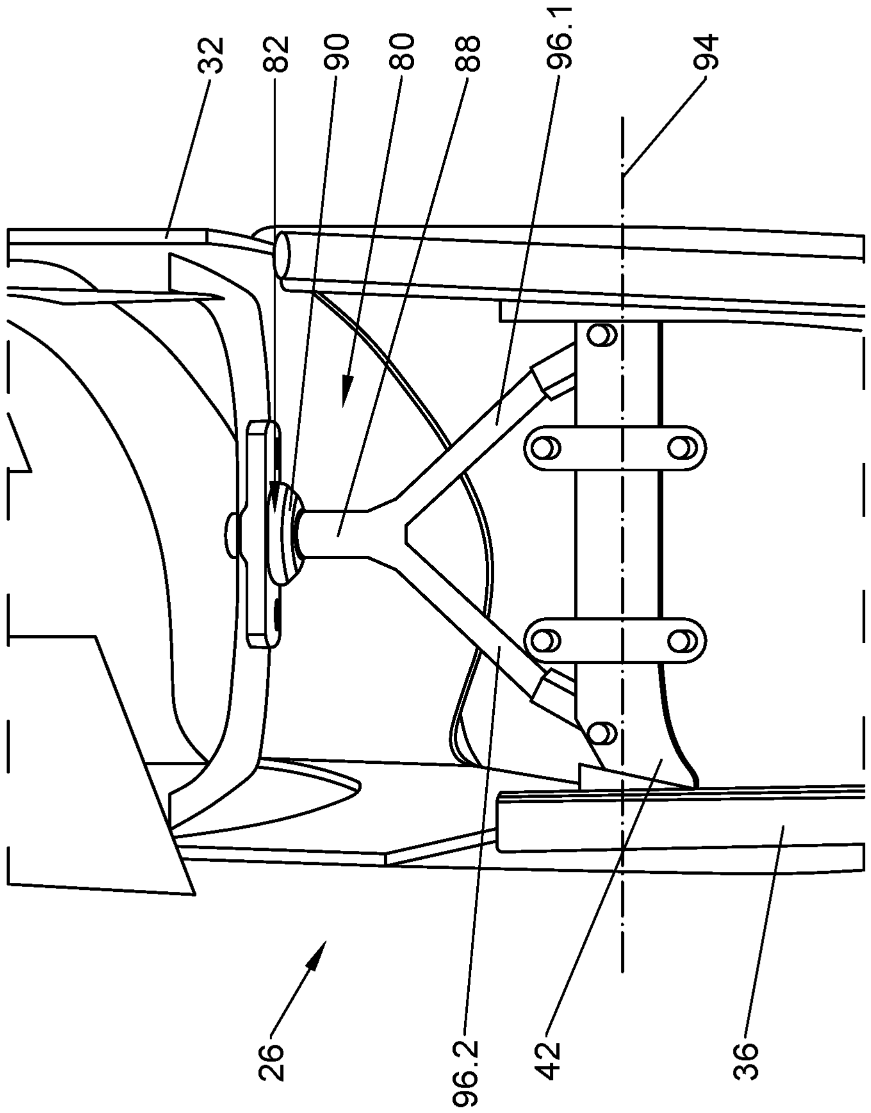
FIG. 15 is a top view onto a fairing joint of the fairing arrangement according to an exemplary embodiment.
Figure 16:
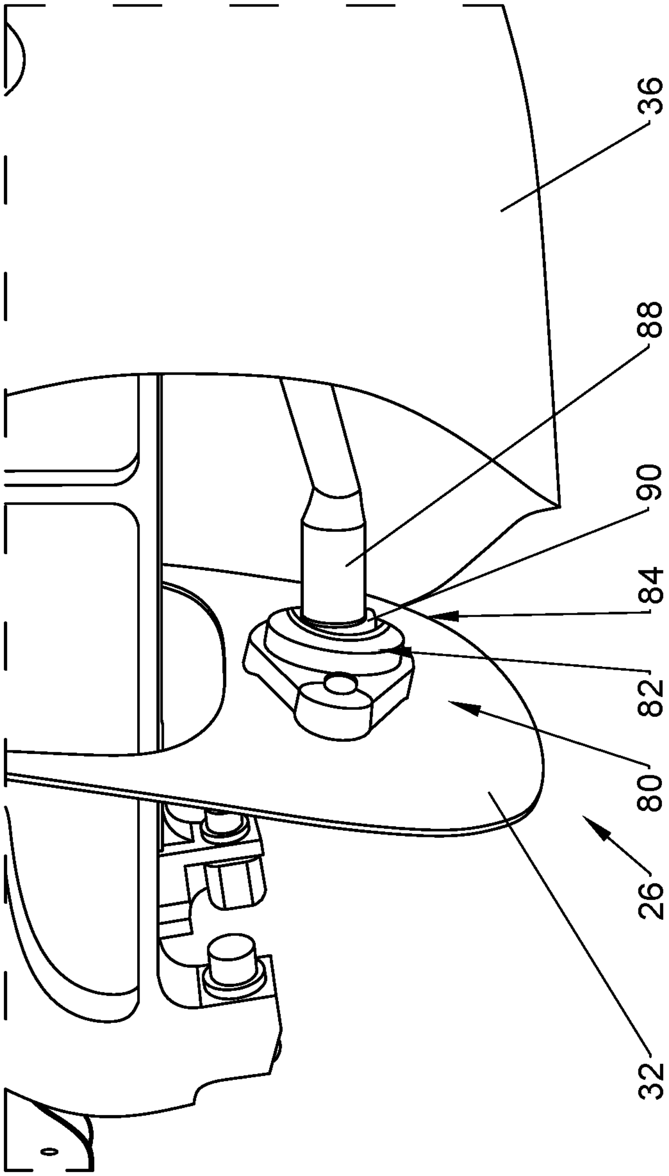
FIG. 16 is a side view, partly broken away, onto a part of the fairing joint of the fairing arrangement according to an exemplary embodiment.
Figure 17:
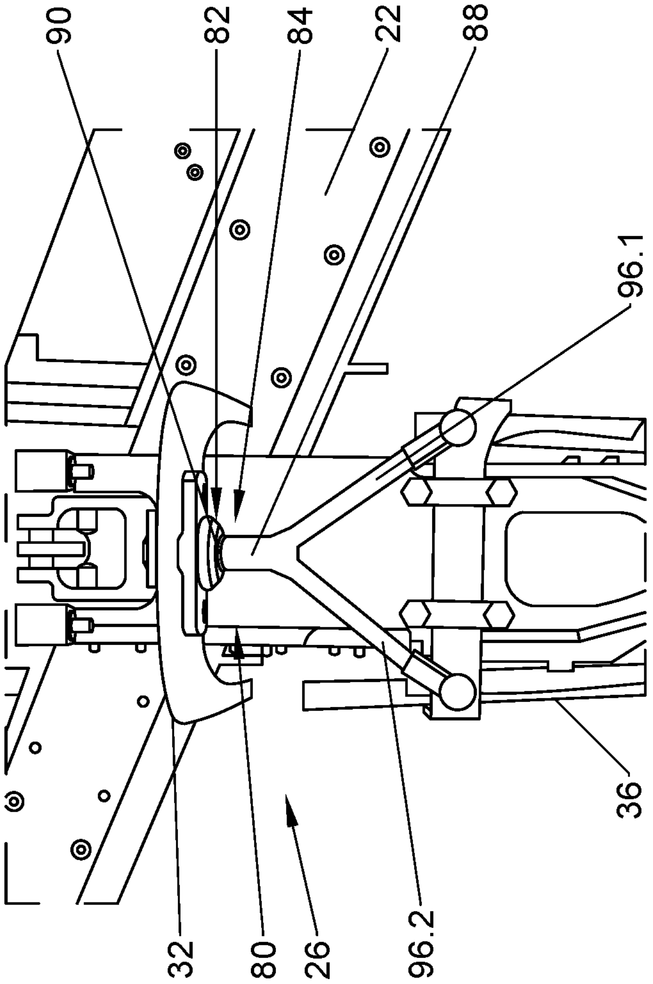
FIG. 17 is a top view similar to FIG. 15, where further parts of the fairings are omitted for illustrative purposes.

Another possible design of the fairing joint 80 is shown in the sixth embodiment as depicted in FIGS. 15 to 17. Compared to the fifth embodiment, the location of the second spherical bearing 82 is inverted. Here one of the bearing elements of the spherical bearing 82 is fixed to the structure of the flap side fairing 32. In an embodiment not shown, the sliding pads 86 with two degrees of freedom are mounted on the wing side fairing 36. In the embodiment as shown in FIGS. 15 to 17, the sliding bearing 84 has the sliding bush 90 connected to the other bearing element of the second spherical bearing 82 while the piston 88 is linked in a manner rotatable around a hinge line to the wing side fairing 36. In the embodiment shown, the ball element of the second spherical bearing 82 is configured as sliding bush 90 and provides a translational joint with one degree of freedom with the piston 88. The piston 88 has one end sliding in the bush 90 and is bifurcated at the other end, wherein a first and second branch 96.1, 96.2 are pivotally linked to a structure, such as the fairing bridge 67 or any other element of the rearward connecting mechanism, of the wing side fairing 36. This provides a rotating joint with one degree of freedom. Overall, the fairing joint 80 of the sixth embodiment also has five degrees of freedom such that lateral movements are transferred, but other relative movements of the fairings 32, 36 are essentially allowed.

Figure 18:
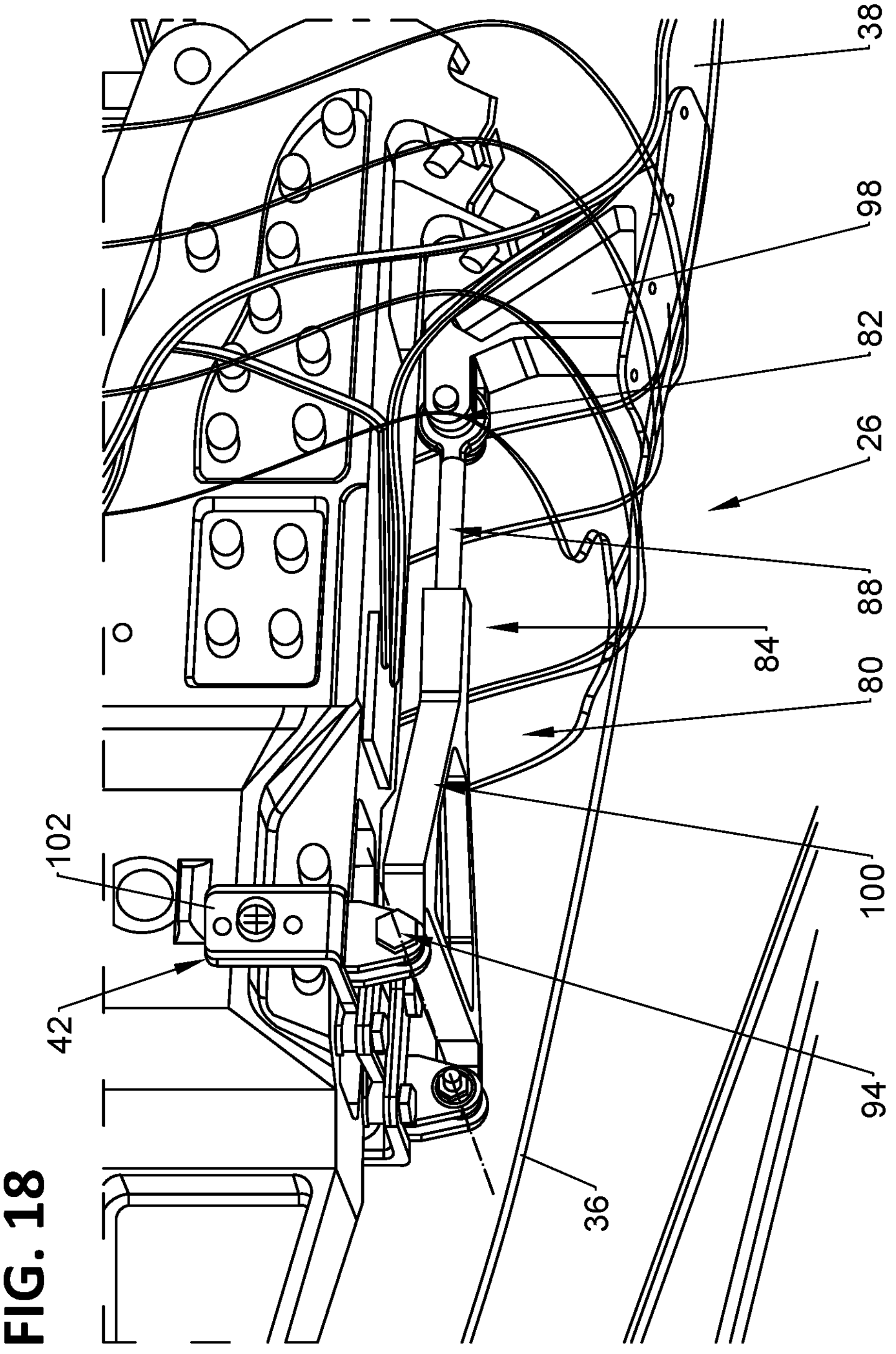
FIG. 18 is a partly transparent perspective side view of the fairing arrangement according to an exemplary embodiment with a different design of the fairing joint.
Figure 19:
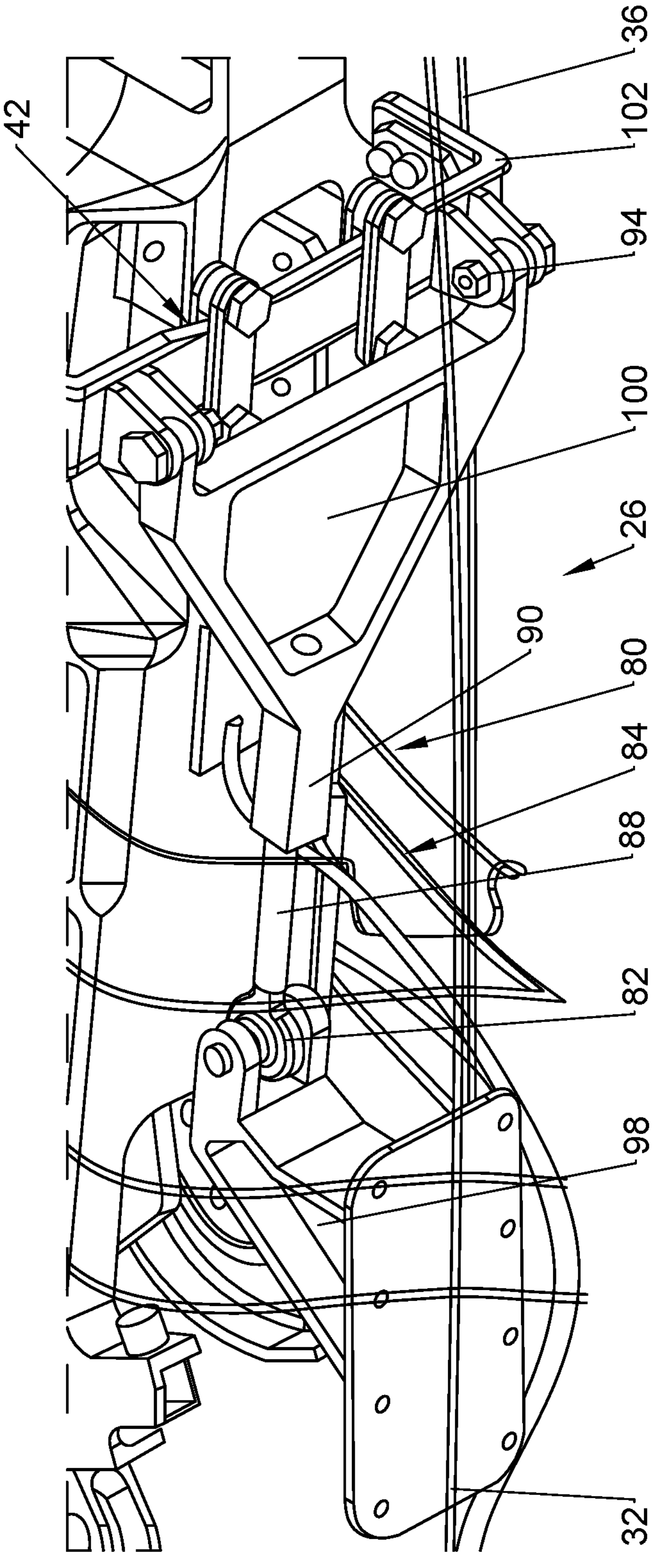
FIG. 19 is a partly transparent bottom view of the fairing arrangement according to an exemplary embodiment.

A similar approach is shown in the seventh embodiment of the fairing arrangement 26 as shown in FIGS. 17 and 18. Here, the ball element of the second spherical bearing 82 is mounted on a bracket 98 fixed inside the flap side fairing 32. A first end of the piston 88 of the sliding bearing 84 is integrally formed with the bearing shell of the second spherical bearing 82. The second end portion of the piston 88 slides in the sliding bush 90 that is arranged on an A-Lever 100 (shaped in form of the letter "A"). The two branches of the A-lever are mounted in order to rotate about the hinge line 94 to a bracket 102 of the rearward connecting mechanism 42.

The different features of different embodiments can be combined as needed. For example, the rearward connecting mechanism 42 may comprise any combination of swing struts, tensile means, cables, linear bearings, track and roller or slider arrangements. Further, while not shown, the fairing joint 80 of any of the first to fourth embodiments may be designed as shown in any of the fifth to seventh embodiment.

A functionally improved fairing arrangement 26 for a high-lift mechanism 20 of an aircraft 10 has been described. The high-lift mechanism 20 includes a flap 22 to be arranged at a trailing edge 16 of an aircraft wing 12 and a mounting and guiding mechanism 24 for the flap 26. The fairing arrangement 26 comprises a flap side fairing unit 28 and a wing side fairing unit 30. The flap side fairing unit 28 comprises a flap side fairing 32 for covering an aft part of the mounting and guiding mechanism 24 and a flap side fairing mount 34 for mounting the flap side fairing 32 to the flap 22. The wing side fairing unit 30 comprises a wing side fairing 36 for covering a forward part of the mounting and guiding mechanism 24 and a wing side fairing mount 38 for mounting the wing side fairing 36 to the wing 12. The wing side fairing mount 38 is configured for movably connecting the wing side fairing 36 to the wing 12, such that the wing side fairing 36 is rotatable around an axis 39 directed at least partially in a vertical direction. A fairing joint 80 couples the flap side fairing 32 and the wing side fairing 36 in order to transfer movements of the flap side fairing 32 to the wing side fairing 36. Hence, a lateral or rotational movement of the wing side fairing 36 is controlled by the flap side fairing 32.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fairing arrangement for an aircraft, comprising:

a flap side fairing unit and a wing side fairing unit, wherein the flap side fairing unit comprises a flap side fairing for covering an aft part of a mounting and guiding mechanism and a flap side fairing mount for rigidly mounting the flap side fairing to a flap at a trailing edge of an aircraft wing, wherein the wing side fairing unit comprises a wing side fairing for covering a forward part of the mounting and guiding mechanism and a wing side fairing mount for mounting the wing side fairing to the wing, wherein the wing side fairing mount is configured for connecting the wing side fairing movably to the wing, wherein the wing side fairing and the flap side fairing are connected by a fairing joint allowing relative movements of the fairings during movement of the flap such that the movement of the wing side fairing is controlled by the movement of the flap side fairing, and wherein the fairing joint is configured in a way that a lateral movement of the flap side fairing guides the lateral or rotational position of the wing side fairing.

2. The fairing arrangement according to claim 1, wherein the fairing joint is configured such that it allows relative movements of the fairings in line of flight, in a vertical direction, around a vertical axis, around a first horizontal axis essentially directed in spanwise direction, and/or a second horizontal axis essentially directed in line of flight, and further affecting a common sideward movement of a rearward end portion of the wing side fairing and of a forward end portion of the flap side fairing.

3. The fairing arrangement according to claim 1, wherein the fairing joint has five degrees of freedom.

4. The fairing arrangement according to claim 1, wherein the fairing joint further comprises a spherical bearing and a sliding bearing.

5. The fairing arrangement according to claim 4, wherein spherical bearing is mounted on one of the fairings, and wherein the sliding bearing is arranged between the spherical bearing and the other one of the fairings, and wherein the sliding bearing further comprises a sliding pad for sliding in a plane, or a piston slidable in a sliding bush, wherein the piston and/or the bush are rotatably mounted to the associated fairing.

6. The fairing arrangement according to claim 1, wherein the wing side fairing mount is configured for connecting the wing side fairing movably to the wing such that the wing side fairing is rotatable around an axis directed at least partially in a vertical direction, and wherein the fairing joint connects the fairings such that the rotational movement of the wing side fairing around the axis is controlled by the movement of the flap side fairing.

7. The fairing arrangement according to claim 1, wherein the wing side fairing mount further comprises a forward connecting mechanism configured to connect a forward part of the wing side fairing rotatably with at least one or with two degrees of freedom to the mounting and guiding mechanism.

8. The fairing arrangement according to claim 7, wherein the forward connecting mechanism includes a multi-axis bearing or a spherical bearing.

9. The fairing arrangement according to claim 1, wherein the wing side fairing mount further comprises a rearward connecting mechanism configured to connect a rearward part of the wing side fairing such that it is movable in a lateral or spanwise direction and especially such that this movement is affected, driven or controlled via the fairing joint.

10. The fairing arrangement according to claim 9, wherein the rearward connecting mechanism includes at least one of the group consisting of a swing strut, a pair of parallel swing struts, a tensile means, a cable, an arrangement of a track and rollers or sliders, an upper track and roller or slider arrangement, a lower track and roller or slider arrangement, a track curved around the rotation axis of the forward connecting mechanism in combination with a set of rollers or sliders running on the curved track, and a linear bearing.

11. The fairing arrangement according to claim 1, wherein a forward end portion of the flap side fairing extends into a rearward end portion of the wing side fairing in a telescopically manner.

12. The fairing arrangement according to claim 1, wherein a fixed front fairing unit configured to be rigidly fixed to the wing, wherein the wing side fairing unit is configured as intermediate movable wing side fairing unit arranged between fixed front fairing unit and the flap side fairing unit.

13. A high-lift system for an aircraft, comprising:

the fairing arrangement according to claim 1, wherein the flap side fairing is rigidly connected to the flap.

14. An aircraft wing comprising the high-lift system according to claim 13.

15. An aircraft comprising the wing according to claim 14.

16. An aircraft wing comprising the fairing arrangement according to claim 1.

17. An aircraft comprising the high-lift system according to claim 13.

18. A fairing arrangement for an aircraft, comprising:

a flap side fairing unit and a wing side fairing unit, wherein the flap side fairing unit comprises a flap side fairing for covering an aft part of a mounting and guiding mechanism and a flap side fairing mount for rigidly mounting the flap side fairing to a flap at a trailing edge of an aircraft wing, wherein the wing side fairing unit comprises a wing side fairing for covering a forward part of the mounting and guiding mechanism and a wing side fairing mount for mounting the wing side fairing to the wing, wherein the wing side fairing mount is configured for connecting the wing side fairing movably to the wing, wherein the wing side fairing and the flap side fairing are connected by a fairing joint allowing relative movements of the fairings during movement of the flap such that the movement of the wing side fairing is controlled by the movement of the flap side fairing, and wherein the fairing joint has five degrees of freedom.

19. A fairing arrangement for an aircraft, comprising:

a flap side fairing unit and a wing side fairing unit, wherein the flap side fairing unit comprises a flap side fairing for covering an aft part of a mounting and guiding mechanism and a flap side fairing mount for rigidly mounting the flap side fairing to a flap at a trailing edge of an aircraft wing, wherein the wing side fairing unit comprises a wing side fairing for covering a forward part of the mounting and guiding mechanism and a wing side fairing mount for mounting the wing side fairing to the wing, wherein the wing side fairing mount is configured for connecting the wing side fairing movably to the wing, wherein the wing side fairing and the flap side fairing are connected by a fairing joint allowing relative movements of the fairings during movement of the flap such that the movement of the wing side fairing is controlled by the movement of the flap side fairing, and wherein the fairing joint further comprises a spherical bearing and a sliding bearing.

* * * * *